Patented Feb. 1, 1938

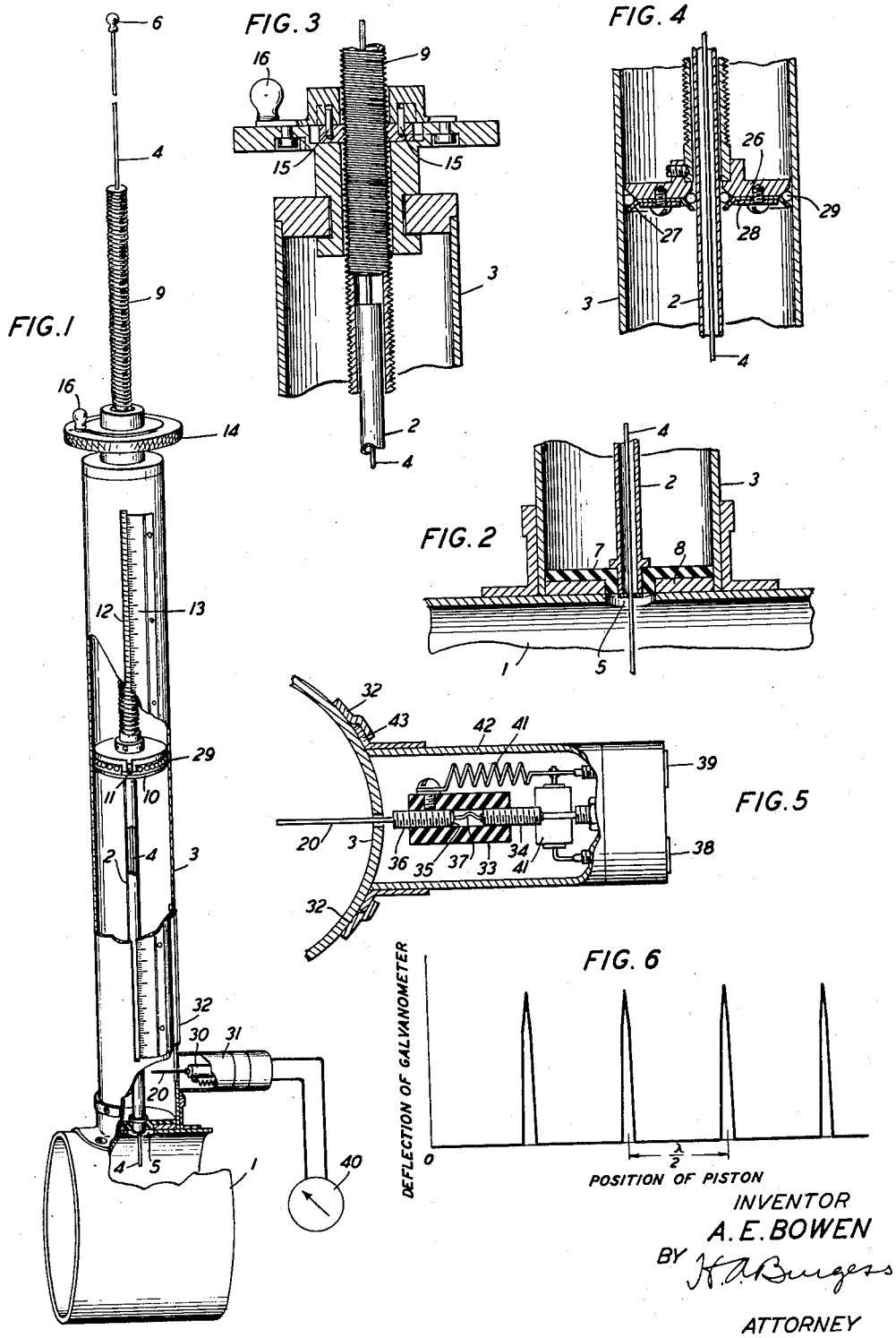

2,106,713

UNITED STATES PATENT OFFICE 2,106,713

WAVE-METER

Arnold E. Bowen, Red Bank, N. J., assignor to Bell Telephone Laboratories, Incorporated, New York, N. Y., a corporation of New York Application April 21, 1936, Serial No. 75,656

10 Claims. (Cl. 178—44)

This invention relates to the art of signaling with electromagnetic waves of ultra high frequencies and more particularly to apparatus and methods for measuring certain characteristics of such waves.

A primary object of the invention is to increase the accuracy and facility of measurement of frequency and wave-length.

A feature of the present invention is that standing waves are established in a shielded transmission line for determining wave-length. Another feature of the invention is that an indication of the amplitude of the standing waves is obtained without substantially interfering with said waves. Other features lie in the mechanical means for precisely adjusting the wave-meter.

In accordance with a preferred embodiment of the present invention the wave-length of high frequency waves is determined by applying said waves to one end of a coaxial conductor line, the effective length of which is adjusted until a condition of resonance obtains. An indicator or detector is provided, responsive to the waves in the resonant line, whereby the proper adjustment of the length of line may be effected. The detector is loosely coupled to the coaxial line so as to minimize its effect on the electrical characteristics thereof. The length of coaxial line required to effect resonance with the applied waves is a measure of the length of said waves in the coaxial line and enables the ready calculation of the frequency of said waves.

The nature of the present invention together with other objects and features thereof will appear more fully in the following description of a specific embodiment, reference being made to the accompanying drawing, in which:

Fig. 1 shows a wave-meter in accordance with the invention as adapted for use with a dielectric guide system;

Figs. 2, 3, 4, and 5 show details of the wavemeter illustrated in Fig. 1; and

Fig. 6 is a typical curve indicative of the precision of the instrument.

In transmitting electromagnetic waves through a hollow metallic conductor containing a dielectric, it is necessary to use exceedingly high frequencies, for example frequencies of the order of 1500 megacycles per second or higher. For measuring these frequencies, or the corresponding wave-lengths in vacuum, the technique used in the ordinary radio frequency range involving tuned circuits composed of coils and condensers, is useless. Also, the method frequently used in the ultrahigh frequency range involving the resonant effects produced on a pair of wires, a Lecher frame, as a short circuiting bridge is moved along the wires, becomes increasingly inexact as the frequency approaches the range of interest in the dielectric guide art; furthermore, the two-wire Lecher frame is not well adapted for abstracting a small amount of energy from an electromagnetic wave in a dielectric guide. On the other hand, the properties of a coaxial conductor pair, in which a central cylindrical conductor forms one side of the circuit and the inner wall of a coaxial outer conductor forms the other side, make it well adapted for measurement of wave-lengths at the frequencies of interest.

It has been shown heretofore that in a coaxial pair made of good conducting material and containing substantially no dielectric material, the wave-length of an electromagnetic disturbance is equal to the wave-length of the disturbance in air, and within a negligibly small difference, to the wave-length in vacuum. Since the velocity of propagation of an electromagnetic wave in vacuum is $3 \times 10^{10}$ centimeters per second, then if the wave-length is measured, the frequency is immediately derivable from the relation:

$$f = \frac{3 \times 10^4}{\lambda}$$

where $f$ denotes the frequency in megacycles per second and $\lambda$ the wave-length in centimeters. Thus if the wave-length in a coaxial pair is measured, the frequency is obtainable from the above formula.

Referring now to Fig. 1 there is shown a wavemeter in accordance with the present invention that is particularly adapted for use with a dielectric guide system. The guide is represented by a short section of metallic pipe 1 and in the particular case illustrated, the dielectric is air. The wave-meter itself comprises inner conductor 2 and outer conductor 3 of a coaxial pair. These are of brass, copper or other good conducting material. The central conductor 2 is tubular, and along its axis there is positioned a third cylindrical conductor or rod 4 which at its lower end passes through a small hole 5 in the wall of pipe 1 and which at the upper end is terminated in a small knob 6 by means of which the rod 4 may be slid axially through conductor 2 and thereby made to extend a greater or lesser distance into pipe 1.

As shown in greater detail in Fig. 2, conductor 2 is attached at its lower end to a thin circular disc 7 of low loss insulating material which in turn is fastened to a circular disc 8 of brass or copper. The latter is connected to the lower end of outer conductor 3.

Referring to Fig. 1 again, there is shown surrounding the inner conductor 2 a closely fitting threaded cylinder 9 which slides over conductor 2 and carries at its lower end a short circuiting bridge or piston 10 through which connection is established between inner and outer conductors 1 and 2 of the coaxial pair. Piston 10 carries a small rider 11 which slides in a slot 12 in the outer conductor 3. The rider 11 is scribed with an index mark which in conjunction with the centimeter scale 13 attached to the outer conductor 3 is used to indicate the position of piston 10. In the particular example under discussion the scale is approximately 35 centimeters in length. The rotating head 14, shown in detail in Fig. 3, contains a split nut 15 which engages the threaded section 9. The latter has a millimeter thread so that one revolution of head 14 advances the piston 10 by a distance of one millimeter. For rapid movement of the piston over considerable distances, the split nut 15 is disengaged from the thread by operation of lever 16, whereupon the piston can be moved by grasping the threaded section extending above head 14.

Details of piston 10 are shown in Fig. 4. A brass or copper disc 26 of slightly smaller diameter than the conductor 3 and having a central hole through it slightly larger than conductor 2 is beveled on its outer edge and on the edge of the hole. An annular disc of phosphor bronze or spring brass 27, reinforced by an annular brass disc or ring 28 is fastened to disc 26, and in the V-shaped slot between it and the beveled edges of disc 26, a number of steel or bronze balls 29 are placed. The force exerted on the balls is such as to force them into intimate contact with conductors 2 and 3 and to cause them to follow any irregularities which there may be in the diameters of conductors 2 and 3. Thus a good electrical connection between the two conductors is insured.

Referring once more to Fig. 1, there is shown a crystal rectifier 30 enclosed in a brass or copper shell 31 and adapted for vertical movement along the conductor 3, being held against the latter by tracks or ways 32. Details of the detector and its mounting are shown in Fig. 5. Into one end of a cylinder 33 of bakelite or other suitable insulating material, drilled axially and threaded, there is screwed a short length of threaded brass rod 36 carrying at its end a small cup in which is firmly fastened a small cylindrical piece of rectifying crystal 35, silicon for instance, with the exposed face highly polished. In the other end is screwed another similar piece of brass rod 34 carrying on its end a short length of fine wire 37, tungsten or phosphor bronze being suitable materials. The fine wire is in light contact with the face of the crystal, the pressure of contact being adjustable by turning threaded rod 36. The antenna 20 is connected to one end of the crystal unit and the other end goes to a jack terminal 38 through which connection can be made to a galvanometer or microammeter 40. A coiled lead, or high frequency choke coil 41, extends from the antenna end of the crystal unit to a second jack terminal 39, and a small by-pass condenser 41 is connected across the jack terminals to prevent the passage of high frequency energy out over the meter leads. The assemblage just described is enclosed in a cylindrical brass shell 42 about one inch in diameter provided with ears 43 which slide in the tracks or ways 32. Crystal rectifiers constructed in this manner have been found to be sufficiently responsive electrically and quite insensitive to mechanical disturbances.

The mode of operation of the wave-meter is as follows: The piston 10 is moved to a position roughly one-half wave-length from the disc 8, in which position the small amount of high frequency energy abstracted from the wave in guide 1 by probe 4 sets up a field of high amplitude in the coaxial system. The detector unit is then slid along conductor 3 until a maximum indication is obtained on the meter 40 connected to it, which occurs when the detector antenna 20 is roughly one-quarter wave-length from disc 8. Probe 4 is then advanced into or retracted from the guide 1 until a convenient deflection, say one-half of full scale, is had on the galvanometer. When these initial adjustments are properly made, the wave-meter will abstract a negligibly small amount of energy from the wave passing down wave guide 1, so that the wave-length can be measured without interference with any intelligence which may be impressed on the wave in the guide. The final step is then to find a series of locations of positions of piston 10 which will give maximum current output into the galvanometer. It is found that as the piston 10 is moved through its range of travel, the galvanometer current is negligibly small except when the distance from piston 10 to disc 8 is very nearly an integral number of half wave-lengths, when the galvanometer current rises rapidly to a peak and then as rapidly drops again to zero. A graph showing the galvanometer current in terms of position of the piston as read on scale 13 is shown on Fig. 6. The distance between the peaks represents one-half the wave-length. Generally speaking, the greater precision in measurement of wave-length is had when the range of movement of the piston is greater so it is advisable to move the piston through as large a number of half waves as the apparatus allows. Thus, for example, if the wave-length to be measured is about 15 centimeters, peaks in galvanometer current would occur for piston positions of about 7.5, 15, 22.5 and 30 centimeters and the wave-length would be $2/3(30-7.5)=15$ cms. since the piston was moved through three half wave-lengths.

Although the present invention has been described with reference to only one specific embodiment of it and as especially adapted for use in a dielectric guide system, it will be obvious that the invention is capable of other embodiments and uses within the spirit and scope of the appended claims.

What is claimed is:

1. The method which comprises converting dielectrically guided waves into conduction current waves in a coaxial conductor line, relating the frequency of said waves and the length of said line to establish standing waves in said line, and obtaining an indication of the field intensity at some point within the space occupied by said standing waves.

2. A wave-meter comprising a pair of coaxial conductors, a metallic disc closing one end of said pair, a metallic disc partially closing the other end of said pair, the latter of said discs having an axial opening therein through which projects a probe connected with the inner of said coaxial conductors, means for adjusting the distance between said discs, and means adapted to locate potential maxima in the space bounded by said conductors and discs.

3. In combination, a metal-sheathed dielectric guide having a lateral opening therein, a section of transmission line having a metallic shield disposed with said shield covering the opening in said guide, means extending through said opening and into said guide for deriving high frequency energy to energize said section of transmission line, and means for adjusting the electrical length of said section of line to establish a condition of resonance.

4. In combination, a dielectric guide having a metallic sheath, a section of coaxial conductor line disposed so that one end thereof is closed by said sheath, a reflector closing the other end of said line, an energy pick-up device connected with the inner of said coaxial conductors and extending through an opening in said sheath, and means for adjusting the axial position of said reflector.

5. In combination, a dielectric guide having a metallic sheath, a section of transmission line having a metallic shield, one end of said transmission line being connected in energy transfer relation with said dielectric guide and the other end of said section of line being closed, and a receiver non-conductively and loosely coupled to said line at an intermediate point thereof.

6. In combination, a short section of transmission line having a metallic shield, an adjustable reflector closing one end of said line, an electromagnetic wave pick-up device extending beyond the other end of said line and connected to energize said line, and another pick-up device comprising a wire projecting through an opening in said shield into the space enclosed by said shield.

7. In combination, a section of coaxial conductor line closed at both ends, means for exciting said line at a frequency for which it is resonant, and a pick-up device extending through an opening in the outer of said conductors into the dielectric space between said conductors, and an external receiver coupled thereto.

8. A wave-meter comprising a transmission line having a metallic shield, two reflecting barriers in said line, one of said barriers comprising a short-circuiting metallic disc longitudinally movable with reference to the other barrier, an index and scale associated with said disc for indicating its longitudinal position, means for exciting the portion of said line between said barriers with ultra-high frequency waves the length of which is to be measured, and means for measuring the relative field intensities at different points between said barriers.

9. A wave-meter comprising a length of coaxial conductor line bounded by reflectors, one of said reflectors being adapted to reflect substantially completely any electromagnetic waves incident upon it, means for exciting said line with waves of a frequency such as to establish standing waves between said reflectors, a detector, an indicating device operatively associated with said detector, and a pick-up device connected in operative relation with said detector and movable between said reflectors in the space between said coaxial conductors.

10. The method of operating with a section of transmission line having a metallic shield and a pair of spaced reflectors which comprises exciting said transmission line with high frequency electromagnetic waves to establish a go-and-return flow of conduction currents therethrough, adjusting the distance between said reflectors to establish standing waves between them and deriving energy from said waves at an intermediate point within said standing waves and in an amount insufficient to affect the length of said standing waves.

ARNOLD E. BOWEN.